United States Patent
Kaushikkar et al.

(10) Patent No.: US 9,021,306 B2
(45) Date of Patent: Apr. 28, 2015

(54) DEBUG ACCESS MECHANISM FOR DUPLICATE TAG STORAGE

(71) Applicant: Apple Inc., Cupertino, CA (US)

(72) Inventors: Harshavardhan Kaushikkar, San Jose, CA (US); Muditha Kanchana, San Jose, CA (US); Gurjeet S Saund, Saratoga, CA (US); Odutola O Ewedemi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 13/713,654

(22) Filed: Dec. 13, 2012

(65) Prior Publication Data

US 2014/0173342 A1 Jun. 19, 2014

(51) Int. Cl.
G06F 11/00 (2006.01)
G06F 11/273 (2006.01)
G06F 11/22 (2006.01)

(52) U.S. Cl.
CPC .......... G06F 11/273 (2013.01); G06F 11/2236 (2013.01)

(58) Field of Classification Search
CPC ............................ G06F 11/2236; G06F 11/273
USPC .......................................... 714/25, 26, 30, 31
See application file for complete search history.

(56) References Cited

U.S. PATENT DOCUMENTS 7,076,767 B1 * 7/2006 Williams ...................... 717/127
2011/0314223 A1 12/2011 Orbach et al.

FOREIGN PATENT DOCUMENTS

EP 0 366 323 5/1990

OTHER PUBLICATIONS

Kelm, John H.; "Hybrid coherence for scalable multicore architectures;" University of Illinois, Dissertation, issued Jan. 14, 2011, retrieved <https://www.ideals.illinois.edu/handle/2142/18272> on Dec. 14, 2012; pp. 1-209.
Zebchuk et al.; "A Tagless Coherence Directory;" MIRCRO'09, Dec. 12-16, 2009, New York, NY, retrieved <http://www.eecg.toronto.edu/~moshovos/research/tagless09.pdf> on Dec. 14, 2012; pp. 1-12.

* cited by examiner

Primary Examiner — Joshua P Lottich
(74) Attorney, Agent, or Firm — Meyertons, Hood, Kivlin, Kowert & Goetzel, P.C.

(57) ABSTRACT

A coherence system includes a storage array that may store duplicate tag information associated with a cache memory of a processor. The system may also include a pipeline unit that includes a number of stages to control accesses to the storage array. The pipeline unit may pass through the pipeline stages, without generating an access to the storage array, an input/output (I/O) request that is received on a fabric. The system may also include a debug engine that may reformat the I/O request from the pipeline unit into a debug request. The debug engine may send the debug request to the pipeline unit via a debug bus. In response to receiving the debug request, the pipeline unit may access the storage array. The debug engine may return to the source of the I/O request via the fabric bus, a result of the access to the storage array.

22 Claims, 3 Drawing Sheets

DEBUG ACCESS MECHANISM FOR DUPLICATE TAG STORAGE

BACKGROUND

1. Technical Field

The present invention relates generally to the field of computer systems, and in particular to methods and mechanisms for accessing a coherence storage during debug operation.

2. Description of the Related Art

A computer system often includes multiple input/output (I/O) devices and a processor sharing one or more memory devices via a memory controller. Many different agents may generate memory transactions and convey these memory transactions to the memory controller. Often, a coherence unit may be used to maintain the ordering and coherence of these memory transactions within the system.

In some systems that include such a coherency unit, a storage within the coherency unit may store coherence information associated with cache tags of one or more cache memories within the computer system. Because of the complex nature of updating the coherence information across all agents in the system, it may be desirable to provide debug access to the storage in the coherency unit while the system continues to operate. In many systems, debug logic includes separate datapaths and access mechanisms to whatever logic block needs to be accessed. However such debug mechanisms may consume additional die area, and may cause some loss of performance, which may be unacceptable. This may be especially true in highly integrated systems such as a system on chip (SoC) designs.

SUMMARY OF THE EMBODIMENTS

Various embodiments of a system and method for accessing a duplicate tag storage using a debug are disclosed. Broadly speaking, a coherence system is contemplated in which a debug request may be sent by an agent such as a system processor to access a storage that stores duplicate tag information corresponding to tag information associated with a cache memory of a system processor. The debug request may be sent on the normal system interconnect fabric using, for example, a programmed input/output (PIO) request. The PIO request may be forwarded through a pipeline unit associated with the storage array to a debug engine. The debug engine may reformat the IO request into a debug command and then send the debug command to the pipeline unit via a different peripheral-type bus. The pipeline unit may then access the storage array in response to receiving the debug request. The results of the debug command may be sent back to the requestor via the fabric interconnect.

In one embodiment, the coherence system includes a storage array that may store duplicate tag information corresponding to tag information associated with a cache memory of a processor. The system may also include a pipeline unit that includes a number of stages. The pipeline unit may control accesses to the storage array. The pipeline unit may also pass through the pipeline stages, without generating an access to the storage array, an input/output (I/O) request that is received on a fabric bus and which specifies an address space that maps to a configuration space. The system may also include a debug engine that may receive the I/O request from the pipeline unit and reformat the I/O request into a debug request. The debug engine may also send the debug request to the pipeline unit via a debug bus. In response to receiving the debug request, the pipeline unit may access the storage array based upon an address and a command type included in the debug request. The debug engine may return to a source of the I/O request via the fabric bus, a result of the access to the storage array.

Figure 1:
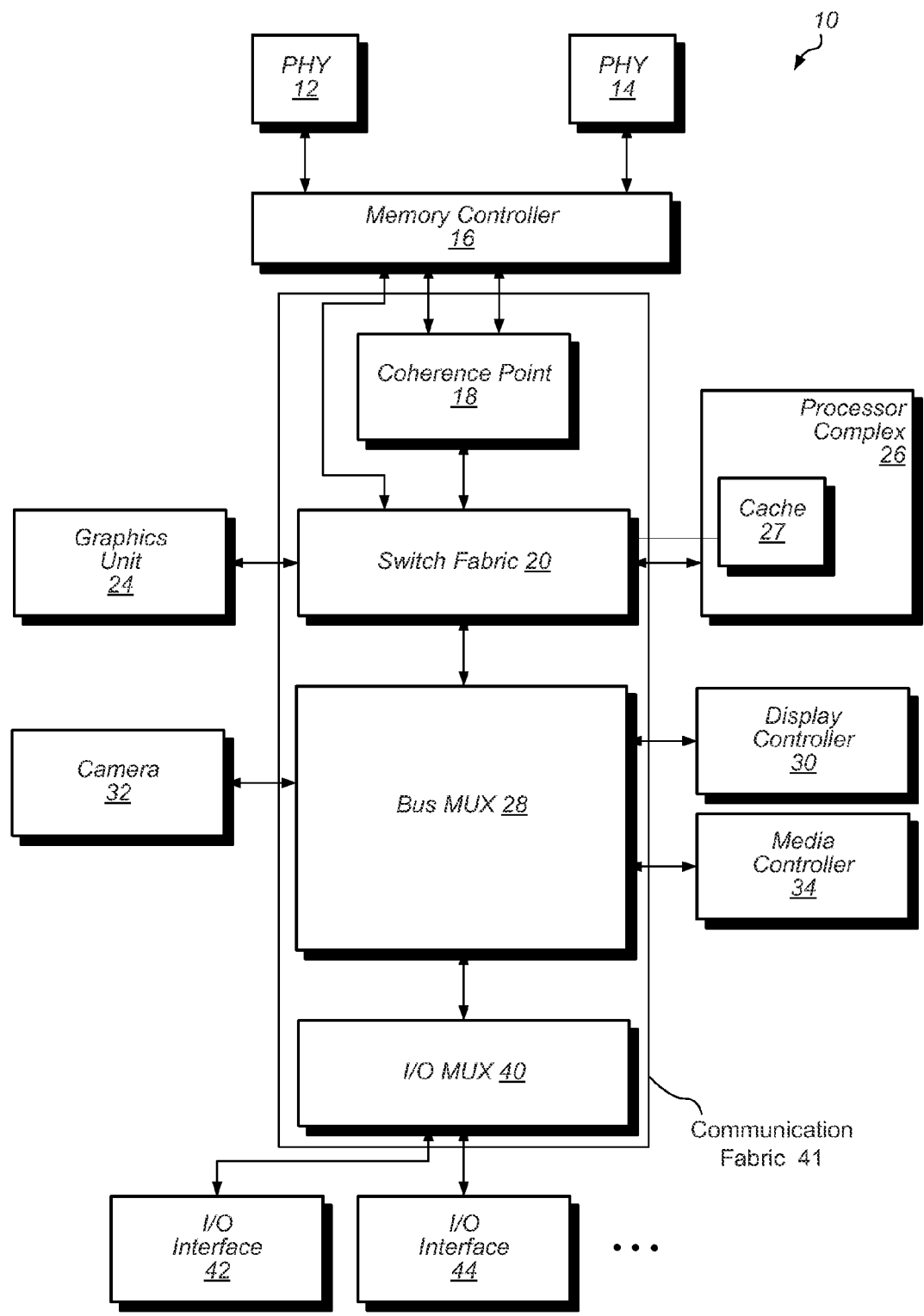
FIG. 1 is a block diagram of one embodiment of a computing system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Turning now to FIG. 1, a block diagram illustrating one embodiment of a computer system is shown. In the illustrated embodiment, system 10 includes processor complex 26, a coherence point 18, a switch fabric 20, a graphics unit 24, a bus multiplexer (mux) 28, a display controller 30, a media controller 34, a camera 32, an input/output (I/O) mux 40, I/O interfaces 42 and 44, a memory controller 16, and memory physical interface circuits (PHYs) 12 and 14. It is noted that system 10 may also include more or fewer components than those shown in FIG. 1. In one embodiment, system 10 may be implemented on a single integrated circuit (IC). In such an embodiment, the system 10 may be referred to as a system on chip (SoC), or an application specific integrated circuit (ASIC), for example.

Components shown within system 10 may be coupled to each other using any suitable bus and/or interface mechanism. In one embodiment, the bus and/or interface mechanism may be compliant with the Advanced Microcontroller Bus Architecture (AMBA®) protocol by ARM Holdings. Examples of AMBA® buses and/or interfaces may include Advanced eXtensible Interface (AXI), Advanced High-performance Bus (AHB), Advanced System Bus (ASB), Advanced Peripheral Bus (APB), Advanced Trace Bus (ATB), etc. However, in other embodiments any other suitable on-chip interconnect specification for the connection and management of logic blocks may be used. Other types of buses and interface mechanisms, such as specialty or proprietary interfaces with custom protocols, may also be utilized to provide connections between any of the various components of system 10.

Processor complex 26 may include one or more central processing units (CPUs) (not shown), one or more supporting cache hierarchies, and multiple other components and logic. In one embodiment, the cache 27 may be representative of a level two (L2) cache, although in other embodiments, cache 27 may reside at any level of cache hierarchy, as desired. The CPU(s) of processor complex 26 may include circuitry to execute instructions defined in any of a variety of instruction set architectures (ISAs). Specifically, one or more programs comprising the instructions may be executed by the CPU(s). For example, in one embodiment, the ARM™ ISA may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, and the like. It is noted that in some embodiments, there may be a separate cache hierarchy and thus a separate cache 27 for each CPU within the processor complex 26.

In various embodiments, the coherence point 18, switch fabric 20, bus mux 28, and I/O mux 40 may implement a communication fabric (or fabric) 41 for providing a top-level interconnect for system 10. In various embodiments, different types of traffic may flow independently through the fabric 41. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels. It is noted that in other embodiments, the fabric 41 shown in FIG. 1 may include more or fewer components or combinations of components as desired Coherence point 18 may be configured to act as a gateway between coherent and non-coherent domains in system 10. Coherence point 18 may be the location in system 10 where memory operations become globally visible. As described in greater detail below in conjunction with the description of FIG. 2, coherence point 18 may also include a duplicate tag storage (shown in FIG. 2) for storing a duplicate set of tags from the L2 cache (e.g., cache 27 in processor complex 26) for all coherent agents in system 10 and which may be snooped by coherence point 18 for coherency operations. Coherence point 18 may also include additional logic (e.g., coherence control unit, memory interface unit, current transaction table, dependency logic unit not shown in FIG. 1). For example, in various embodiments, coherence point 18 may include cache coherency logic employing a cache coherency protocol to ensure data accessed by each agent is kept up to date. An example of a cache coherency protocol includes the MOESI protocol with the Modified (M), Owned (O), Exclusive (E), Shared (S), and Invalid (I) states. Coherence point 18 is coupled to switch fabric 20, and may be coupled to other devices of system 10 via switch fabric 20. Switch fabric 20 may be used to aggregate traffic from multiple devices within system 10. In some embodiments, coherence point 18 and switch fabric 20 may be integrated within a single structure which may be referred to as a coherent switch.

Coherence point 18 may allow memory access requests from any requestor in system 10 to snoop the cache hierarchy of processor complex 26 without causing bottlenecks at the processor complex 26. Thus, data produced by the CPUs of processor complex 26 may not be explicitly flushed for the data to be visible to the other devices and agents of system 10. If the most recent copy of data is present in the cache hierarchy, then read requests may receive the most recent copy from the cache hierarchy. For write requests, merging may be performed for a cache line present in the cache hierarchy for any requestor in system 10.

Bus mux 28 is coupled to memory via switch fabric 20, and bus mux 28 is also coupled to display controller 30, media controller 34, and camera 32. In other embodiments, bus mux 28 may also be coupled to other devices (e.g., flash controller) not shown in FIG. 1. Bus mux 28 is also coupled to I/O mux 40, which is coupled to I/O interfaces 42 and 44.

I/O interfaces 42 and 44 are representative of any of a variety of I/O interfaces or devices connected to I/O mux 40. I/O interfaces 42 and 44 may provide interfaces to any type of peripheral device implementing any hardware functionality included in the system. For example, I/O interfaces 42 and 44 may connect to audio peripherals such as microphones, speakers, interfaces to microphones and speakers, audio processors, digital signal processors, mixers, etc. Other I/O devices may include interface controllers for various interfaces external to system 10, including interfaces such as Universal Serial Bus (USB), peripheral component interconnect (PCI) including PCI Express (PCIe), serial and parallel ports, general-purpose I/O (GPIO), universal asynchronous receiver/transmitter (uART), FireWire, Ethernet, analog-to-digital converter (ADC), digital-to-analog converter (DAC), and so forth. Other I/O devices may also include networking peripherals such as media access controllers (MACs), for example.

System 10 may group processing blocks associated with non-real-time memory performance, such as the media controller 34, for image scaling, rotating, and color space conversion, accelerated video decoding for encoded movies, audio processing and so forth. Camera 32 and media controller 34 may include analog and digital encoders, decoders, and other signal processing blocks. In other embodiments, the system 10 may include other types of processing blocks in addition to or in place of the blocks shown.

Memory controller 16 may include one or more memory caches (not shown). The memory caches may be used to reduce the demands on memory bandwidth and to reduce power consumption. The allocation policy for the memory caches may be programmable. Memory controller 16 may include any number of memory ports and may include circuitry configured to interface to memory. For example, memory controller 16 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc. Memory controller 16 may also be coupled to memory physical interface circuits (PHYs) 12 and 14. Memory PHYs 12 and 14 are representative of any number of memory PHYs which may be coupled to memory controller 16. Memory PHYs 12 and 14 may be configured to interface to memory devices (not shown). Memory PHYs 12 and 14 may handle the low-level physical interface to the memory devices. For example, the memory PHYs 12 and 14 may be responsible for the timing of the signals, for proper clocking to synchronous DRAM memory, etc.

Figure 2:
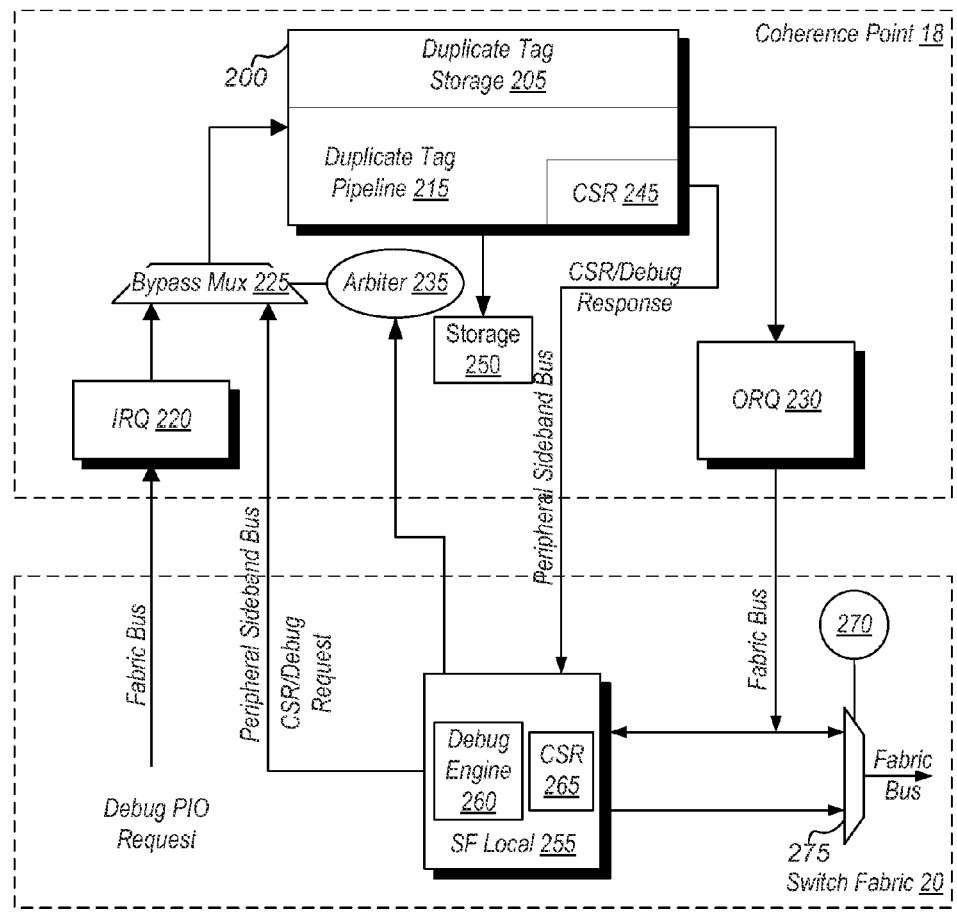
FIG. 2 is a block diagram illustrating more detailed aspects of an embodiment of the coherence point and the switch fabric of FIG. 1.

Referring to FIG. 2, a block diagram illustrating more detailed aspects of the embodiment of the coherence point and the switch fabric of FIG. 1 is shown. The embodiment of FIG. 2 includes a portion of the coherence point 18 and a portion of the switch fabric 20. As shown, the coherence point 18 includes a duplicate tag unit 200 that includes a duplicate tag storage 205, a duplicate tag pipeline unit 215, and a control status register unit 245. The coherence point 18 also includes an incoming request queue (IRQ) 220 that is coupled to receive incoming requests to the DT pipeline unit 215 via a fabric bus. The IRQ 220 is coupled to one input of a bypass mux 225, which is in turn coupled to the duplicate tag pipeline unit 215. The bypass mux 225 is controlled by an arbiter 235. The duplicate tag pipeline unit 215 is coupled to an outgoing request queue 230, which is in turn coupled to an output fabric mux 275 and to a switch fabric (SF) local control unit 255 within the switch fabric 20. The output fabric mux 275 is controlled by the control logic 270. The SF local unit 255 is coupled to the other input of the bypass mux 225 and to the arbiter 235. It is noted that in the embodiment shown in FIG. 2, only one duplicate tag unit 200 and associated logic is shown. However, it is contemplated that in other embodiments, there may be a duplicate tag unit 200 and associated logic for each of the CPUs and cache storage units 27 in the processor complex 26 of FIG. 1.

In one embodiment, requests from devices/components coupled to the switch fabric 20 may be conveyed upon the fabric bus. For example, requests from the processor complex 26 of FIG. 1 may be conveyed upon the fabric bus. In contrast, requests emanating from within the switch fabric may be conveyed upon, for example, the peripheral sideband bus. More particularly, as shown switch fabric 20 includes a debug engine and CSR unit 265 within the SF local unit 255. Requests that are sourced from the SF local unit 255 may be conveyed to the bypass mux 225, for example, using the peripheral sideband bus. As mentioned above, in one embodiment, the peripheral sideband bus may be implemented as an APB bus.

Accordingly, during operation of the system 10, snoop requests to the duplicate tags storage 205 from devices coupled to the switch fabric 20 may be conveyed upon the fabric bus to the IRQ 220. The arbiter 235 may control which requests are sent to the DT pipeline 215 between the IRQ 220 and the debug input to the bypass mux 225. More particularly, entries in the UIRQ 220 may not be picked by the arbiter if the entries have unresolved dependencies.

In one embodiment, the duplicate tag storage 205 may be configured to store the ESI coherency state, for example, and copies of the L2 cache tags for all coherent agent's L2 entries that map to the coherence point 18. In one embodiment, the storage may be implemented as a multi-way RAM such as SRAM, for example. Accesses to the DT storage 205 are controlled by the DT pipeline 215, which may include a number of stages. In various embodiments, the DT pipeline 215 may be implemented as a four or five stage pipeline. The DT pipeline 215 may be configured to look up an incoming address in the DT storage 205 and the incoming tag is compared with the L2 duplicate tags in the associated cache block. For each tag hit, the corresponding duplicate tag state bits may be selected and assembled to represent the state of the line across all the coherent agents (e.g., CPUs). This information may be used to set up that particular transaction's associated scoreboard state. Based on the transaction type the final cache tags and updated states for each coherent agent (e.g., CPU) are calculated and updated in the L2 Duplicate Tags as part of the pipeline, and do not wait for the transaction to complete. In one embodiment, the DT pipeline 215 may be implemented as a read/modify/write (RMW) pipeline. As such, in one embodiment as each transaction enters and exits the DT pipeline 215, the state of that associated cache block is updated in the duplicate tags to reflect the state at the end of the transaction. A younger request with the same address as an existing request in the IRQ 220 may be considered a dependent request. Dependent requests wait in the IRQ 220 until their dependency is cleared. In other words they are not allowed to look-up and use the Duplicate tag/state data until the previous transactions are completed and de-allocated.

The various requests include coherent R/W, non-coherent R/W and Programmed I/O (PIO). PIO requests are requests that are destined to agents in address space other than the main memory space. That other space is referred to a reflected space. In one embodiment, PIO requests may also be routed through the DT pipeline 215. However, as described further below PIO requests may pass through the DT pipeline 215 without causing an access to the storage array(s) of the DT storage 205. PIO requests may be forwarded to the destination identified in the request. Other types of requests enter the DT pipeline 215 and the response data (for a read) is sent to the requesting agent via the ORQ 230 and the fabric bus.

In response to a device or agent such as the processor complex 26, for example, requesting a debug access to the DT unit 200, the request is sent along the fabric bus as a PIO request to the IRQ. The switch fabric 20 may be configured to identify the address of the PIO request as being mapped to reflected space. Accordingly, the switch fabric 20 may be configured to append an identifier to the request that identifies the SF local 255 as the destination. Accordingly, when the PIO request is picked from the IRQ 220 by the arbiter 235, it passes through the DT pipeline 215 and the ORQ 230 to the SF local unit 255. The debug engine 260 within the SF local unit 255 determines that the request is a debug access request and formats the request as a debug request to the DT storage 205. The debug engine then sends the debug request to the bypass mux 225 via the peripheral sideband bus. The arbiter 235 is notified that there is a debug request pending. In one embodiment, if there are no other debug requests in the DT pipeline 215, the arbiter 235 may pick the debug request at the next available opportunity according to a particular pick algorithm. The debug access request enters the DT pipeline 215, and generates a read request to one or more locations in the DT storage 205, if the request is a read request. If the request is a write request, the DT pipeline 215 will generate a write to the DT storage 205, and writing a data payload associated with the write request.

In one embodiment, the debug access may read one way of the n-way storage array within DT storage 205. The tag data may be output and provided to the debug engine 260. In some cases it may be desirable to read out all of the data from the DT storage 205 at one time to avoid having the data change as it is being read out. In this way, a snapshot, so to speak, of the DT storage 205 may be obtained. However, because the debug requests are designed to be intermingled with normal operational requests to the duplicate tag unit 200 it may be possible for an interleaved normal request to update the tag information before all the data is read out. Accordingly, a number of different mechanisms may be used to allow a snapshot of the DT storage 205 to be obtained.

More particularly, in one embodiment, a special debug read request may be used which causes a multi-way read operation to be performed. Similar to a burst read of contiguous addresses, this special read may cause the DT storage logic and the DT pipeline 215 to successively access and output the data from all ways of the DT storage 205 in a contiguous manner onto the peripheral sideband bus over several bus cycles. During this type of read, the DT pipeline 215 would effectively be stalled for the number of cycles it takes to read the data based on the bandwidth of the peripheral sideband bus. In one implementation, the data may be sent to a separate storage (e.g., storage 250) via a separate high bandwidth bus and subsequently read out and provided to the debug engine 260 as desired without holding up the DT pipeline 215 longer than necessary.

In another embodiment, the debug engine 260 may set an initialization bit in the IRQ 220. The initialization bit is typically used during an initialization sequence when, for example, CSRs 245 are being initialized. This bit once set, locks the arbiter 235 from picking any requests from the IRQ 220 that have the ability to modify the contents of the DT storage 205. Accordingly, the initialization bit may be set during the debug access to allow all data to be read from the DT storage 205 while blocking normal requests such as coherent accesses, for example, from entering the DT pipeline 215. However, some non-coherent and PIO requests may be allowed to enter the DT pipeline 215.

In one embodiment, the debug engine 260 may format a debug response which includes the response data from the DT storage 205. The debug engine 260 may output the formatted response through the output mux 275 onto the fabric bus where it is sent to the requesting agent (e.g., CPU).

Figure 3:
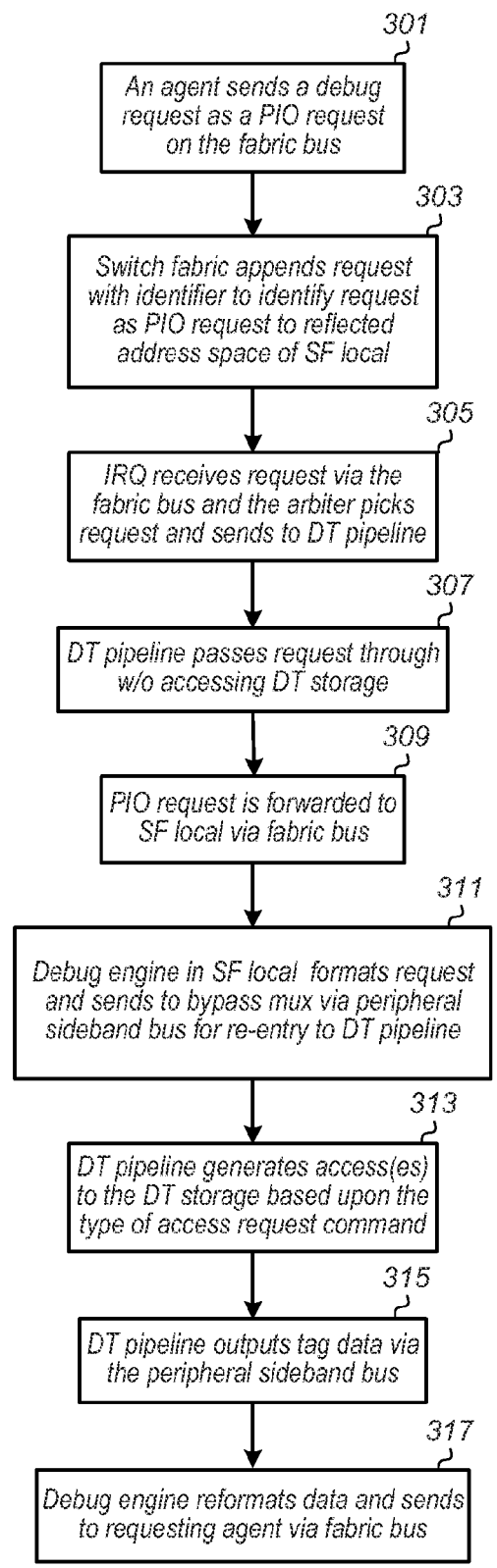
FIG. 3 is a flow diagram depicting the operation of the embodiments of the coherence point and the switch fabric shown in FIG. 1 and FIG. 2.

In FIG. 3, a flow diagram depicting the operation of the embodiments of the coherence point and the switch fabric of FIG. 1 and FIG. 2 is shown. Referring collectively to FIG. 1 through FIG. 3, and beginning in block 301 of FIG. 3, an agent such as, for example, a CPU of the processor complex 26 in the computer system 10 may send a debug request on the fabric bus. The request may be formatted as a PIO request having an address that maps to reflected address space other than memory. The switch fabric may append to the request an identifier that identifies the address as reflected space that may map to CSR space of the SF local unit 255 (block 303). The IRQ 220 may receive the request via the fabric bus along with other normal requests to the DT pipeline 215. The arbiter 235 may pick the PIO request from among the waiting requests according to one or more selection algorithms (block 305).

Once the arbiter 235 forwards the PIO request to the DT pipeline 215, the DT pipeline 215 may recognize the request as a PIO request and simply pass the request through the stages of the DT pipeline without generating an access to the DT storage 205 (block 307). The DT pipeline 215 forwards the PIO request to the SF local unit 255 via the ORQ 230 and the fabric bus (block 309). The SF local unit 255 recognizes the request based upon the address. The debug engine 260 re-formats the request as a debug request. The request may be a read request or a write request in various embodiments.

The debug engine 260 then forwards the debug request to the bypass mux 225 via the peripheral sideband bus (block 311). The debug access request enters the DT pipeline 215 when picked by the arbiter 235 as described above. Based upon the type of command in the debug request, the DT pipeline 215 generates an access to one or more locations in the DT storage 205 as described above (block 313).

More particularly, in various embodiments the tag data in the DT storage 205 may be either modified by a write debug request or read out by a read debug request. In response to a read debug request the tag data is output as a response onto the peripheral sideband bus and forwarded to the debug engine 260 (block 315). If the request was a write request, the DT pipeline 215 may issue a write response/completion to indicate that the write operation completed. As described above, a variety of mechanisms may be used to read all of the data out of the DT storage 205 as a snapshot. That is to obtain all of the data without the data changing before it is read out.

The debug engine 260 may reformat the write response or the read data into one or more packets for conveyance on the fabric bus. The SF local unit 255 may forward the packet(s) to the requesting agent (i.e., the source of the debug request) via the fabric bus (block 317). It is noted that the debug request source may be a device such as a testing device connected to the system 10 via one of the I/O interfaces (e.g., 42 or 44).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A coherence system comprising:
a storage array configured to store duplicate tag information corresponding to tag information associated with a cache memory of a processor;
a pipeline unit including a plurality of pipeline stages and coupled to the storage array, wherein the pipeline unit is configured to control accesses to the storage array;
wherein the pipeline unit is further configured to pass through the pipeline stages, without generating an access to the storage array, an input/output (I/O) request that is received on a fabric bus and which specifies an address space that maps to a configuration space; and
a debug engine coupled to receive the I/O request from the pipeline unit and configured to reformat the I/O request into a debug request, and send the debug request to the pipeline unit via a debug bus;
wherein in response to receiving the debug request, the pipeline unit is configured to access the storage array based upon an address and a command type included in the debug request; and
wherein the debug engine is configured to return to a source of the I/O request via the fabric bus, a result of the access to the storage array.

2. The system of claim 1, further comprising an input request queue coupled to the pipeline unit and configured to hold requests to access the storage array.

3. The system of claim 2, further comprising an arbiter unit coupled to the input request queue and configured to select the requests to access the storage array based upon a selection algorithm.

4. The system of claim 2, wherein in response to forwarding to the pipeline unit a particular debug request which has not been completed, the input request queue is configured to block normal requests having the ability to modify the tag information in the storage array.

5. The system of claim 4, wherein the input request queue is configured to assert a control register bit to block the normal requests, and to de-assert the control register bit in response to the particular debug request completing access to the storage array.

6. The system of claim 4, wherein the input request queue is configured to forward normal requests having no ability to modify the tag information in the storage array, subsequent to forwarding to the pipeline unit the particular debug request which has not been completed.

7. The system of claim 2, further comprising a fabric switch unit coupled to the input request queue and configured to append the I/O request to include an identifier that identifies the debug engine as the destination of the I/O request.

8. The system of claim 1, wherein the pipeline unit is configured to read out contents of one way of a plurality of ways of the storage array in response to receiving a debug read command.

9. The system of claim 1, wherein the pipeline unit is configured to read out contents of all ways of a plurality of ways of the storage array in response to receiving a debug read command.

10. A method comprising:
    storing within a storage array duplicate tag information corresponding to tag information associated with a cache memory of a processor;
    a pipeline unit accessing the storage array in response to receiving via a fabric bus access requests including addresses that map to memory addresses, and passing through the pipeline unit, without accessing the storage array, an input/output (I/O) request that is received on a fabric bus and which specifies an address space that maps to a configuration space;
    a debug engine receiving the I/O request, reformatting the I/O request into a debug request, and sending the debug request to the pipeline unit via a debug bus;
    the pipeline unit accessing the storage array based upon an address and a command type included in the debug request; and
    the debug engine returning to a source of the I/O request via the fabric bus, a result of the access to the storage array.

11. The method of claim 10, further comprising storing access requests within an input request queue prior to the pipeline unit receiving the access requests.

12. The method of claim 10, further comprising blocking from access to the pipeline unit, access requests having the ability to modify the tag information in the storage array in response to forwarding to the pipeline unit a particular debug request which has not been completed.

13. The method of claim 12, further comprising asserting a control register bit to block the access requests, and de-asserting the control register bit in response to the particular debug request completing access to the storage array.

14. The method of claim 12, further comprising forwarding to the pipeline unit access requests having no ability to modify the tag information in the storage array, subsequent to forwarding to the pipeline unit a debug request which has not been completed.

15. A system comprising:
    a storage array configured to store duplicate tag information corresponding to tag information associated with a cache memory of a processor;
    a pipeline unit coupled to the storage array and configured to forward, without generating an access to the storage array, an input/output (I/O) request that is received on a fabric bus and which specifies an address space that maps to a configuration space; and
    wherein the pipeline unit is further configured to generate an access to the storage array in response to receiving a debug request generated in response to receiving the I/O request that was forwarded by the pipeline unit;
    a debug engine configured to receive and to forward to a source of the I/O request via the fabric bus, a result of the access to the storage array.

16. The system of claim 15, wherein the pipeline unit is further configured to read out contents of one way of a plurality of ways of the storage array in response to receiving a debug read command.

17. The system of claim 15, wherein the pipeline unit is further configured to read out contents of all ways of a plurality of ways of the storage array in response to receiving a debug read command.

18. The system of claim 17, further comprising a storage device coupled to the pipeline unit and configured to store the result of the access to the storage array, wherein the result includes data from all the ways of the storage array.

19. A method comprising:
    storing within a storage array duplicate tag information corresponding to tag information associated with a cache memory of a processor;
    a pipeline unit accessing the storage array in response to receiving via a fabric bus access requests including addresses that map to memory addresses, and forwarding, without accessing the storage array, an input/output (I/O) request that is received on a fabric bus and which specifies an address space that maps to a configuration space;
    the pipeline unit generating an access to the storage array in response to receiving a debug request that was generated in response to receiving the I/O request that was forwarded by the pipeline unit; and
    a debug engine receiving and forwarding to a source of the I/O request via the fabric bus, a result of the access to the storage array.

20. The method of claim 19, further comprising blocking from access to the pipeline unit, access requests having the ability to modify the tag information in the storage array in response to forwarding to the pipeline unit a particular debug request which has not been completed.

21. The method of claim 19, further comprising forwarding to the pipeline unit access requests having no ability to modify the tag information in the storage array, subsequent to forwarding to the pipeline unit a particular debug request which has not been completed.

22. A computer system comprising:
    a processor unit including cache memory;
    a coherence system coupled to the processor unit, wherein the coherence system includes:
        a storage array configured to store duplicate tag information corresponding to tag information associated with the cache memory;
        a pipeline unit coupled to the storage array and configured to forward, without generating an access to the storage array, an input/output (I/O) request that is received on a fabric bus and which specifies an address space that maps to a configuration space; and
        wherein the pipeline unit is further configured to generate an access to the storage array in response to receiving a debug request generated in response to receiving the I/O request that was forwarded by the pipeline unit;
a debug engine configured to receive and to forward to a source of the I/O request via the fabric bus, a result of the access to the storage array.

* * * * *